W. C. FENTON.
SPRING SUSPENSION MECHANISM FOR VEHICLES AND THE LIKE.
APPLICATION FILED JAN. 22, 1913.
1,109,912. Patented Sept. 8, 1914.
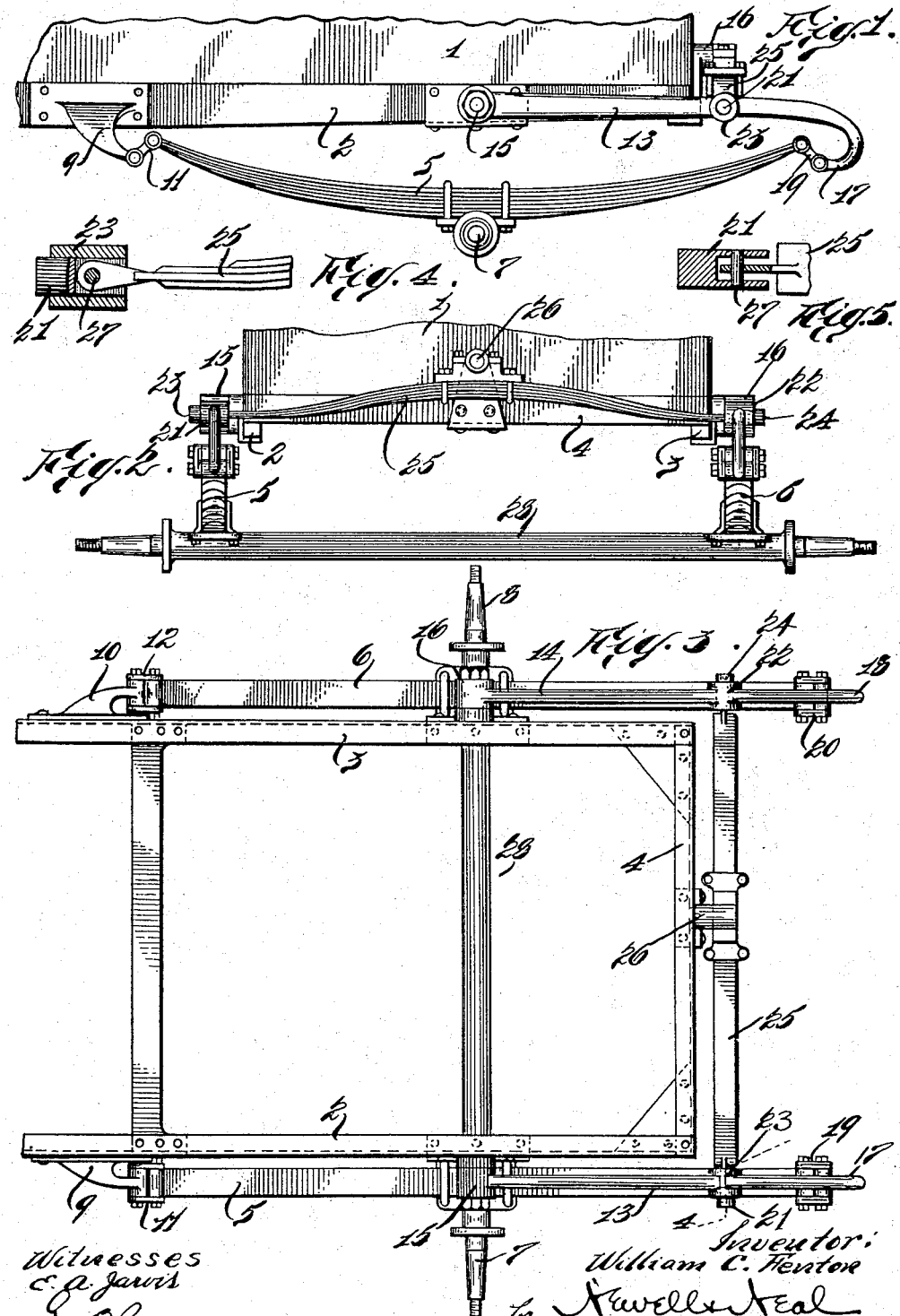

UNITED STATES PATENT OFFICE.

WILLIAM CHARLES FENTON, OF NEW YORK, N. Y., ASSIGNOR OF ONE-HALF TO HENRY F. WELLS, OF NEW YORK, N. Y.

SPRING SUSPENSION MECHANISM FOR VEHICLES AND THE LIKE.

1,109,912. Specification of Letters Patent. Patented Sept. 8, 1914.

Application filed January 22, 1913. Serial No. 743,503.

*To all whom it may concern:*

Be it known that I, WILLIAM C. FENTON, a citizen of the United States, residing at New York city, county and State of New York, have invented certain new and useful Improvements in Spring Suspension Mechanism for Vehicles and the like, of which the following is a clear, full, and exact description.

This invention relates to an improvement in spring suspension mechanism for vehicles and the like, and obtains many advantages over the ordinary side vehicle springs and the well known three point suspension arrangement in the matter of taking up overloads and distributing concussions due to sudden jars more evenly to the vehicle body.

Further advantages and functions of my improvement will become apparent from a clear understanding of the following specification which describes one preferred embodiment of my invention.

The scope of my invention will be set forth in the appended claims.

In the drawings, Figure 1 is a side elevation of the spring mechanism, showing so much of a vehicle as is necessary to the complete understanding of the invention; Fig. 2 is a rear elevation thereof; Fig. 3 is a plan of the same; and Figs. 4 and 5 are details of one of the connections.

Referring more particularly to the drawings, a portion of the vehicle body herein illustrated is indicated at 1, having sides 2 and 3 and rear 4. Preferably at each side of the vehicle body is arranged a side spring 5 and 6 respectively, extending longitudinally thereof. Referring to one of said springs such as 5, this may be connected in the usual way to the axle of the vehicle wheel (not shown) and at one end, preferably the forward end, may be connected by the usual shackle 11 to the stationary bracket 9 fixed to the body of the vehicle. The other or rear end of the spring 5 is preferably connected to the side of the vehicle by an arrangement which permits increased vertical movement under resilient control, but prohibits lateral movement of the same with respect to said vehicle body. This arrangement is preferably constructed as follows: A substantially rigid lever arm 13 is pivotally mounted on the side of the vehicle at 15 preferably directly above the axle or wheel support 7. From its pivot this arm 13 extends horizontally and rearwardly of the vehicle body providing a goose neck extension 17 to which the rear end of the spring 5 may be connected by the usual shackle 19. It is understood that an arm 14 is similarly mounted at the other side 3 of the vehicle and both of these arms are normally restrained from movement by any suitable resilient device,—in the present case a transverse spring 25 connected thereto at its ends. This transverse spring is preferably mounted at the rear of the vehicle upon a pivot stud 26 and has suitable connections at its ends with the arms 13 and 14 to permit the up and down movement of said arms and also to permit of its own expansion under load.

A suitable connection between the outer ends of the spring 25 and the arms 13, 14 is illustrated in detail by Figs. 4 and 5. Each arm 13 and 14 is formed with a sleeve bearing 23 arranged to receive a cylindrical block 21 for sliding and turning movement therein. The end of the spring 25 may be connected to the cylindrical block by a pin 27 preferably longer than the width of the spring 25, whereby said spring may have a slight lateral play upon said pin 27. (See Fig. 5.) It will be observed that by this connection an additional vertical movement of the present side spring members over the commonly connected side spring is permitted when an overload occurs, and this additional vertical movement is not only controlled by resilient devices such as an auxiliary spring, but also by means of this auxiliary spring 25 is enabled to transfer part of its throw to the spring at the other side of the vehicle, thus tending to preserve the body of the vehicle substantially level at all times even though one wheel or the other is dropping into holes or rising over bumps. Moreover, by means of the connection shown, the lateral swinging of the vehicle body so objectionable in the common three point suspension arrangement of springs is practically eliminated. In other words, the present construction gives all the lateral stability afforded by ordinary side spring connections, and in addition obtains improved results over the ordinary three point suspension arrangement.

Although I have described and illustrated a preferred embodiment of my improvement for the clear understanding of my invention, nevertheless I do not wish my invention to be limited to the precise construction shown, as it is obvious that many variations can be made therein without departing from the spirit or scope of my invention.

What I claim as new is:—

1. In a spring suspension mechanism for vehicles and the like, in combination, a longitudinal spring interposed between said vehicle body and its wheel support, means connecting said vehicle body to an end of said spring, comprising a longitudinal lever arm pivoted to said vehicle body directly above said wheel support and extending rearwardly therefrom, said lever arm being connected at its outer end to said spring, and a resilient device intermediate the ends of said lever arm for resisting the movement of said arm.

2. In a spring suspension mechanism for vehicles and the like, in combination, a longitudinal spring at each side of said vehicle interposed between said vehicle body and its wheel support, means connecting said vehicle body to an end of each spring comprising a longitudinal lever arm pivoted to said vehicle body at each side thereof, and a transverse leaf spring member mounted on said vehicle body and extending across the same with its ends connected to said pivoted lever arms.

3. In a spring suspension mechanism for vehicles and the like, in combination, a longitudinal spring at each side of said vehicle interposed between said vehicle body and its wheel support, means connecting said vehicle body to an end of each spring, comprising a longitudinal lever arm pivoted to said vehicle body at each side thereof and extending rearwardly therefrom, and a transverse spring member pivotally mounted on said vehicle body and having its ends connected to said pivoted lever arms.

4. In a spring suspension mechanism for vehicles and the like, in combination a longitudinal spring at each side of said vehicle interposed between said vehicle body and its wheel support, a longitudinal lever arm pivoted to said vehicle body at each side thereof and connected at one end to the adjacent longitudinal spring, a transverse spring member pivotally mounted on said vehicle body and having its ends connected to said pivoted lever arms.

5. In a spring suspension mechanism for vehicles and the like, in combination a longitudinal spring at each side of said vehicle interposed between said vehicle body and its wheel support, a longitudinal lever arm pivoted to said vehicle body at each side thereof directly above said wheel support, said lever being connected at one end to the adjacent longitudinal spring, and a transverse leaf spring mounted on said vehicle body and having each end connected to a pivoted lever arm intermediate the ends of said arm.

6. In a spring suspension mechanism for vehicles and the like, in combination a longitudinal spring at each side of said vehicle interposed between said vehicle and its wheel support, means connecting said vehicle body to an end of each spring, comprising a longitudinal lever arm pivoted to said vehicle body at each side thereof, and a transverse spring member mounted on said vehicle body having a connection between its ends and said pivoted lever arms to allow a relatively oscillatory and sliding movement therebetween, comprising a cylindrical block sliding in a tubular bearing.

7. In a spring suspension mechanism for vehicles and the like in combination, a longitudinal spring at each side of said vehicle interposed between said vehicle body and its wheel support, means connecting said vehicle body to an end of each spring comprising a lever arm pivoted to said vehicle body at each side thereof, and means extending transversely of said vehicle body for connecting said lever arms to a rear portion of said vehicle body.

8. In a spring suspension mechanism for vehicles and the like in combination, a longitudinal spring at each side of said vehicle interposed between said vehicle body and its wheel support, means connecting said vehicle body to an end of each spring comprising a lever arm pivoted to said vehicle body at each side thereof, and a movable transverse member connecting said lever arms to a rear portion of said vehicle body.

9. In a spring suspension mechanism for vehicles and the like in combination, a longitudinal spring at each side of said vehicle interposed between said vehicle body and its wheel support, means connecting said vehicle body to an end of each spring comprising a lever arm pivoted to said vehicle body at each side thereof, and resiliently controlled means extending transversely of said vehicle body for connecting said lever arms away from their pivots to a rear portion of said vehicle body.

Signed at New York city, N. Y., this 20th day of January 1913.

WILLIAM CHARLES FENTON.

Witnesses:
BEATRICE MIRVIS,
FLORENCE JACKSON.

---

Copies of this patent may be obtained for five cents each, by addressing the "Commissioner of Patents, Washington, D. C."